June 23, 1964  J. BOIGE ETAL  3,138,583
PROCESS FOR THE INDUSTRIAL MANUFACTURE OF HYDROXOCOBALAMIN
Filed Sept. 8, 1961
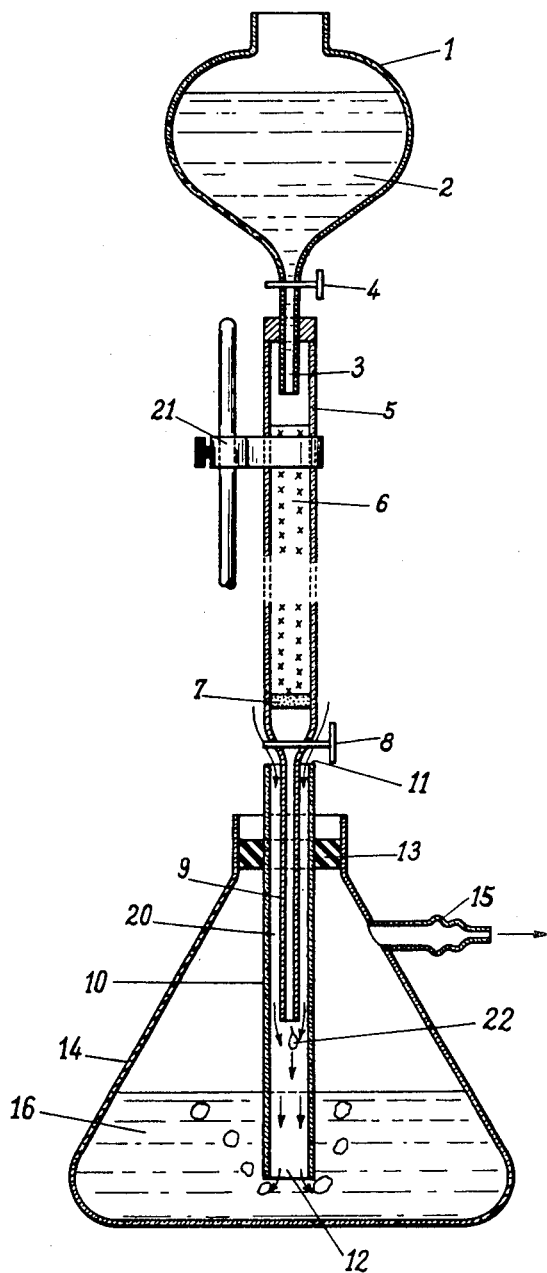
INVENTORS
JEAN BOIGE
ROBERT COTE
ATTY.

United States Patent Office 3,138,583
Patented June 23, 1964

3,138,583
PROCESS FOR THE INDUSTRIAL MANUFACTURE
OF HYDROXOCOBALAMIN
Jean Boige, 53 Blvd. Vercingetorix, Aulnay-sous-Bois,
France, and Robert Cote, 28 Blvd. de Belgique,
Monaco, Monaco
Filed Sept. 8, 1961, Ser. No. 136,840
Claims priority, application Monaco Sept. 22, 1960
4 Claims. (Cl. 260—211.5)

This invention relates to a process for the industrial manufacture of hydroxocobalamin from cyanocobalamin.

Cyanocobalamin is well known and constitutes vitamin $B_{12}$ and has a CN group within an organic molecule of complex structure. A description of vitamin $B_{12}$ and its complete formula and an explanation of its properties are given, for example, in the "Merck Index," 1960 edition, page 1098.

For pharmaceutical use, there is today a tendency to prefer hydroxocobalamin, which frequently called vitamin $B_{12}b$, to cyanocobalamin.

Hydroxocobalamin has a formula which is derived from the foregoing by replacement of the cyanide group by a hydroxy group.

In fact, hydroxocobalamin, which has basic properties, enters more readily into the individual metabolism.

Various processes are already known for converting vitamin $B_{12}$ to vitamin $B_{12}b$. For example, according to a known process, the CN group is first eliminated in an acid medium from the cyanocobalamin molecule, and is replaced by another anion such as $Cl^-$, and then the resultant ester is converted to hydroxocobalamin.

However, the first reaction has only a very low yield so that the process is without interest from the industrial aspect.

According to another known process, catalytic hydrogenation of the cyanocobalamin is carried out in order to convert it into cobalamin, which is then oxidised in order to give hydroxocobalamin.

The drawback of this process is the use of an expensive catalyst and the fact that it is necessary to handle hydrogen gas, which is always dangerous. Furthermore, the reaction is not stoichiometric. Numerous factors come into play, particularly the efficacy of the catalyst, to modify the reducing power of the resultant hydrogen. The process may then result in very low yields owing to destruction of the cobalamin molecule if the reduction is carried too far.

The process forming the subject of the present invention obviates the disadvantages of previous processes while enabling the required conversion to be carried out with a very advantageous yield and with the use of only inexpensive reagents. It further enables the quantity of active hydrogen to be regulated in dependence on the quantity of cyanocobalamin to be reduced so that quantitative reactions are obtained.

According to the invention, the process for the preparation of hydroxocobalamin (vitamin $B_{12}b$) from cyanocobalamin (vitamin $B_{12}$) by means of hydrogenation followed by oxidation is characterised principally in that hydrogenation is carried out "in situ" by nascent hydrogen by the contact of an acid cyanocobalamin solution with granulated zinc, whereupon oxidation is carried out by bubbling an oxidising gas through the resultant liquid diluted with water.

The process is preferably carried out at ambient temperature under atmospheric pressure and hydrogenation is effected by passing the acid solution over a column of finely granulated zinc.

To attack the zinc, a strong mineral acid may be used, such as hydrochloric, hydrobromic, hydriodic acids, or sulphuric acid, with a pH substantially between 2 and 2.5 for the acid solution.

The grain size of the zinc powder used is in turn preferably between 200 and 1400 microns, advantageously 500 to 800 microns.

The oxidising gas which operates by bubbling may, quite simply, be air. Soluble zinc salts mixed with the product are then eliminated by converting them into insoluble zinc hydroxide by the action of a mineral base such as soda, potash, or baryta, and by filtration.

The resultant hydroxocobalamin is then preferably subjected to purification.

If a purity corresponding to the industrial product (approximately 70%) is sufficient, the following process may be adopted: The hydroxocobalamin is crystallised in aqueous solutions of water-soluble organic solvents in which cyanocobalamin and hydroxocobalamin are practically insoluble, thus enabling the solubility factor to be utilised according to the water-content of the solvent. Solvents such as tetrahydrofuran, dioxan and acetone are particularly suitable.

These substances will hereinafter be referred to as "preferred solvents."

The concentration of the solvent in water is determined by allowing for the difference in solubility of hydroxocobalamin in water and in tetrahydrofuran, dioxan or acetone, and in aqueous solutions of these substances at different concentrations.

The reactions will be detailed hereinafter and the same applies to the practical methods of performing the process, by the usual symbolic representation of the complex cyano or hydroxocobalamin molecule simply by the cobalt group.

The cyanocobalamin is dissolved in the selected halogen acid or in sulphuric acid, the pH of which is between 2 and 2.5. This solution is then passed over a column of metallic zinc powder (preferred grain size 500 to 800 microns). The nascent hydrogen instantaneously liberated by the action of the acid on the zinc reduces the cyanocobalamin. The CN group is thus eliminated from the molecule, which is converted into methyl amine, while the cobalt passes from valence 3 to valence 2 (cobalamin):

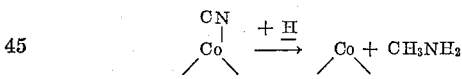

The solution is oxidised immediately on leaving the column by bubbling with air in the presence of water. The cobalt becomes trivalent once again and fixes a hydroxy group to give hydroxocobalamin:

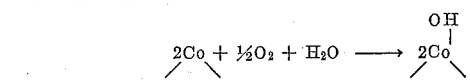

Ambient temperature and atmospheric pressure are used for the process, with pure commercial cyanocobalamin.

The cyanocobalamin is soluble in the acids selected (HCl, HBr, HI, $H_2SO_4$) but is not attacked in the cold state by them.

The speed of passage of the solution through the zinc column must be controlled so that the pH, which was between 2 and 2.5 for the solution passed over the column, has a value equal substantially to 6.5 at the outlet.

If the passage is too fast, hydrogenation may be incomplete.

If the speed of flow is too slow, since the process according to the invention ensures that there is a quantitative relationship between the quantity of acid used and the quantity of cyanocobalamin to be reduced, there is no danger of destruction of cobalamin molecules by excessive hydrogenation. However, it is preferable to pass the liquid at the highest possible speed compatible with complete hydrogenation to enable oxidation to be carried out immediately after reduction.

The speed of flow depends upon the dimensions of the apparatus. For example, with a column of a diameter of 40 mm. containing a height of zinc of 15 cm., the flow is between 0.600 and 0.800 litre per hour.

The methodic character of the reaction used enables a proportional influence to be exerted on the various equilibrium displacing factors, and this constitutes one of the essential advantages of the process according to the invention. Another advantage, which incidentally is related to the aforesaid advantage, is the high yield of the reactions. Hereinbelow will be described an apparatus which can be used for the successive hydrogenation and oxidation operations.

To free the resultant hydroxocobalamin solution from the soluble zinc salts it contains, these salts are converted into insoluble zinc hydroxide by the action of a mineral base such as NaOH, $Ba(OH)_2$, as well as $NH_4OH$ by bringing the pH of the solution to a value above 9.2. The solution is then filtered to eliminate the precipitated zinc hydroxide, and the filtrate is evaporated in vacuo until dry. The residue taken up in a small quantity of methyl alcohol gives a red solution. This is filtered, and then the filtrate is evaporated to obtain the crude hydroxocobalamin.

The hydroxocobalamin formed may be identified by conventional tests: chromatography, coefficient of division between benzyl alcohol and water, acidimetric titration curves, or spectrography for example.

Further details about the identification methods and the relations between hydroxocobalamin and cyanocobalamin may be found in the following literature:

J. C. Heathcote—Chemistry & Industry, 1953; Analyst, 1954 (dosage of hydroxocobalamin in the presence of cyanocobalamin).

Raczka—Journ. Amer. Chem. Soc., 1949 and 1951.

Fricke—Federation Process, March 1950.

W. L. C. Veer—Biochimica et Biophysica acta 6, 1950 (relation between cyanocobalamin and hydroxocobalamin).

To obtain industrially pure hydroxocobalamin, crystallisation in a preferred solvent may be carried out as already stated.

To this end, the crude product is redissolved in distilled water which is free from $CO_2$ (so as to avoid the formation of any carbonates), and the pH is adjusted to a value between 8.5 and 9.5. The preferred solvent is then added in a sufficient quantity corresponding substantially to 75–85% of solvent to 25 to 15% of water, the proportion of 80% being preferred. The solution is then left to stand at low temperature (about 5 to 10° C.) to obtain crystallisation. The crystals are collected by filtration, washed with acetone and ether, and then dried in vacuo for some hours. This results in industrially pure hydroxocobalamin (approximately 70% purity).

If it is required to obtain a product of greater purity, it is naturally possible to carry out supplementary purification of the crude product, more particularly by effecting chromatographic separation between the hydroxocobalamin and the cyanocobalamin that it may contain. These subsequent purification processes are outside the present invention.

The accompanying drawing is an elevation and axial section of a preferred apparatus for the performance of the process according to the invention.

Reference 1 denotes a funnel into which is introduced the cyanocobalamin acid solution charge denoted by reference 2. The stem 3 of the funnel 1 is provided with a cock 4 enabling the flow to be controlled, and it is fixed so as to be fluid-tight to the top of a column 5 of an appreciable height which is held by an adjustable support 21. The column 5 contains granulated zinc 6 which is retained by a porous disc 7 disposed at the bottom. A cock 8 serves to control the flow of liquid leaving the column 5, which terminates in a stem 9 of reduced thickness which dips into a vertical tube 10. The inside diameter of the tube 10 is larger than the outside diameter of the stem 9 so as to form a free annular space 20 between them. The tube 10, of which the top end 11 and the bottom 12 are open, is fixed to be fluid-tight in the stopper 13 of a flask 14 having a spout 15 for connection to a flexible tube leading to a vacuum pump (not shown).

At the beginning of the operation the flask 14 contains water 16 to a level below that of the spout 15 while the bottom end 12 of the tube 10 dips into the water.

After passing through the column 5 and undergoing hydrogenation, the solution falls into the water 16 through the bottom end of the stem 9, while air penetrates through the top end 11 of the tube 10 into the annular space 20 under the effect of suction applied to the spout 15. This air continues to break up the drops such as 22 and it entrains the resultant droplets. Beyond the end 12 the air thus charged with droplets bubbles into the mixture formed by the water and the solution which has arrived there. The cobalamin can thus be oxidised.

This very simple apparatus enables industrial manufacture to be carried out.

*Example 1*

0.20 g. of cyanocobalamin is dissolved in 50 cc. of a decinormal hydrochloric acid solution. This solution is passed over a column of 40 g. of granulated metallic zinc (between 500 and 800 microns). When all the solution has been introduced and passed over the column, the latter is washed twice with 10 cc. of distilled water.

The liquids are collected in a flask through which a stream of air is bubbled during the entire operation.

The air oxidation is continued for 10 minutes after the last washing water has been received. The solution is then of a ruby red colour.

It is neutralised by means of a decinormal soda solution with agitation to eliminate the zinc salts, the solution is filtered and then evaporated in vacuo at a low temperature (5 to 10° C.) until dry. 0.17 g. of crude hydroxocobalamin is thus obtained. This product is then dissolved in 20 cc. of demineralised water freed of $CO_2$, 180 cc. of acetone are added, and the solution is left to crystallise in the cold state for 24 hours.

The crystallised hydroxocobalamin crystals formed are collected by filtration, and then washed with a few cc. of acetone and then ether. They are then dried in vacuo at ambient temperature. These crystals represent substantially 0.13 g. of hydroxocobalamin.

*Example 2*

40 g. of vitamin $B_{12}$ are dissolved in 8 liters of a ⅛ normal sulphuric solution. This solution is passed over a column containing 600 g. of granulated metal zinc of a grain size equal to about 1000 microns. The passage of the acid is controlled by keeping the pH of the liquid obtained at about 6.5. The column is then rinsed twice with 500 cc. of water successively.

Air bubbling is continued for 10 minutes after the completion of the rinsing operations.

The resultant solution is neutralised with soda to a pH of 9.5.

The solution is then filtered and evaporated in vacuo at low temperature until dry. The product is then dissolved in 2 litres of demineralised water freed of $CO_2$. 18 litres of acetones are added and the solution is left to crystallise between 5 and 10° C. for 24 hours.

It is filtered, washed with acetone and ether and dried in vacuo at ambient temperature. 33 g. of hydroxocobalamin crystals are obtained.

*Example 3*

The procedure of Example 2 is used, the 8 litres of sulphuric solution containing the 40 g. of vitamin $B_{12}$ being passed through the zinc column in 4 hours.

The resultant solution is treated with baryta to bring its pH to 9.5. Zinc hydroxide is first precipitated and then barium sulphate. 32.5 g. of hydroxocobalamin crystals are finally obtained.

*Example 4*

A solution of 10 g. of cyanocobalamin in 2.5 litres of decinormal sulphuric acid is prepared. The solution is passed over a column of 400 g. of granulated zinc of a grain size of about 800 microns. The passage lasts for 2 hours. At the outlet of the column the pH is 6.4. Rinsing is carried out and air bubbling is continued as previously.

Lime is used for neutralisation with agitation until the pH is kept at a value of above 9.5. The zinc precipitates in the form of a hydrate which is eliminated with the greater part of the resultant sulphate.

Filtration is carried out and the procedure of the previous examples is adopted. Hydroxocobalamin crystals representing 6.5 g. of pure product are obtained.

*Example 5*

5 g. of cyanocobalamin are dissolved in 1 litre of hydriodic acid in a decinormal solution. The solution is passed over a granulated zinc column as hereinbefore. After oxidation, the zinc is precipitated by the addition of soda. Using the procedure as outlined hereinbefore, hydroxocobalamin crystals are obtained which represent substantially 3.2 g. of pure product.

*Example 6*

5 g. of cyanocobalamin are dissolved in 1.250 litres of hydrobromic acid in a decinormal solution. By using the procedure as above, 3 g. of pure hydroxocobalamin are obtained.

*Example 7*

The procedure of the previous example is adopted but 9 volumes of dioxan are added to the aqueous solution of hydroxocobalamin obtained. The solution is left to crystallise in the cold state for 24 hours. Hydroxocobalamin crystals are obtained which, after drying, represent 2.8 g. of pure hydroxocobalamin.

*Example 8*

The procedure as in Example 2 is adopted, but 9 volumes of tetrahydrofuran are added to the crude hydroxocobalamin aqueous solution and the solution is left to crystallise for 24 hours.

Crystals which, after drying, represent 31.5 g. of pure hydroxocobalamin are obtained.

What we claim is:

1. A process for the preparation of hydroxocobalamin (vitamin $B_{12}b$) from cyanocobalamin (vitamin $B_{12}$), said process comprising reducing cyanocobalamin to cobalamin by passing a solution of said cyanocobalamin in a strong inorganic acid selected from the group consisting of hydrochloric acid, hydrobromic acid, hydriodic acid and sulfuric acid through a column of zinc granules whereby the nascent hydrogen produced by the reaction between said zinc and said acid reduces the cyanocobalamin to cobalamin, the pH of said solution being substantially between 2 and 2.5, controlling the rate of passage of said acid solution through said column so that the pH of the solution delivered by said column is about 6.5, collecting said delivered solution and oxidizing the cobalamin therein by bubbling air therethrough, and thereafter separating hydroxocobalamin from said oxidized solution.

2. A process for the preparation of hydroxocobalamin (vitamin $B_{12}b$) from cyanocobalamin (vitamin $B_{12}$), said process comprising reducing cyanocobalamin to cobalamin by passing a solution of said cyanocobalamin in a strong inorganic acid selected from the group consisting of hydrochloric acid, hydrobromic acid, hydriodic acid and sulfuric acid through a column of zinc granules, the granulometry of which is substantially between 200 and 1,400 microns, whereby the nascent hydrogen produced by the reaction between said zinc and said acid reduces the cyanocobalamin to cobalamin, the pH of said solution being substantially between 2 and 2.5, controlling the rate of passage of said acid solution through said column so that the pH of the solution delivered by said column is about 6.5, oxidizing by blown air said delivered solution containing cobalamin as soon as it leaves said zinc column, collecting said delivered solution and pursuing the oxidizing thereof by bubbling air therethrough, and thereafter separating hydroxocobalamin from said oxidized solution.

3. A process for the preparation of hydroxocobalamin (vitamin $B_{12}b$) from cyanocobalamin (vitamin $B_{12}$), said process comprising passing through a column of zinc granules, the granulometry of which is substantially between 200 and 1,400 microns, a solution of cyanocobalamin in a strong inorganic acid selected from the group consisting of hydrochloric acid, hydrobromic acid, hydriodic acid and sulfuric acid, the pH of said solution being substantially between 2 and 2.5, whereby said cyanocobalamin is reduced to cobalamin by the nascent hydrogen resulting from the action of said acid on said zinc, controlling the rate of passage of said acid solution through said column so that the pH of the solution delivered by said column is about 6.5, dispensing the droplets of said solution containing cobalamin when delivered by said zinc column by the application of a flow of air, and bubbling said flow of air through water charged with said dispersed solution.

4. A process for the preparation of hydroxocobalamin (vitamin $B_{12}b$) from cyanocobalamin (vitamin $B_{12}$), said process comprising passing through a column of zinc granules a solution of cyanocobalamin in a strong inorganic acid selected from the group consisting of hydrochloric acid, hydrobromic acid, hydriodic acid and sulfuric acid, the pH of said solution being substantially between 2 and 2.5, whereby the cyanocobalamin is reduced to cobalamin by the nascent hydrogen resulting from the action of said acid on said zinc, controlling the rate of passage of said acid solution through said column so that the pH of the solution delivered by said column is about 6.5, collecting said delivered solution containing cobalamin, diluting it with water and oxidizing the same by bubbling air therethrough, precipitating the soluble zinc salts contained therein by adding thereto an inorganic base selected from the group consisting of soda, ammonia and baryta, and thereafter separating hydroxocobalamin.

References Cited in the file of this patent

UNITED STATES PATENTS

| 2,653,900 | Holland | Sept. 29, 1953 |
| 2,738,302 | Kaczka | Mar. 13, 1956 |
| 3,007,916 | Bernauer et al. | Nov. 7, 1961 |

OTHER REFERENCES

Ellingboe et al.: Chemical Abstracts, vol. 50, page 5860d (1956).

Fredlin et al.: Chemical Abstracts, vol. 54, page 20983f (1960).

Wood et al.: Inorganic Chemistry, page 362, Butterworth & Co., Ltd., London, 1960.